United States Patent
Gruca et al.

(10) Patent No.: US 10,488,255 B2
(45) Date of Patent: Nov. 26, 2019

(54) OPTICAL SENSOR SYSTEM WITH SPECTRAL ANALYSIS ARRANGEMENT DETECTING A PERIODICITY IN A SPECTRAL RESPONSE OF A FABRY-PEROT STRUCTURE

(71) Applicant: OPTICS11, Amsterdam (NL)

(72) Inventors: Grzegorz Gruca, Amsterdam (NL); Niek Rijnveld, Amsterdam (NL)

(73) Assignee: OPTICS11, Amsterdam (NL)

( * ) Notice: Subject to any disclaimer, the term of this patent is extended or adjusted under 35 U.S.C. 154(b) by 0 days.

(21) Appl. No.: 15/773,108

(22) PCT Filed: Nov. 7, 2016

(86) PCT No.: PCT/EP2016/076896
§ 371 (c)(1),
(2) Date: May 2, 2018

(87) PCT Pub. No.: WO2017/077138
PCT Pub. Date: May 11, 2017

(65) Prior Publication Data
US 2018/0321085 A1    Nov. 8, 2018

(30) Foreign Application Priority Data
Nov. 6, 2015 (EP) .................................. 15193443

(51) Int. Cl.
*G01J 3/26* (2006.01)
*G01L 1/24* (2006.01)
*G01J 3/02* (2006.01)

(52) U.S. Cl.
CPC ............. *G01J 3/26* (2013.01); *G01J 3/0218* (2013.01); *G01L 1/242* (2013.01)

(58) Field of Classification Search
CPC ............. G01J 3/26; G01J 3/0218; G01L 1/242
See application file for complete search history.

(56) References Cited

U.S. PATENT DOCUMENTS

| 2005/0046862 A1 | 3/2005 | Melnyk |
| 2014/0098371 A1* | 4/2014 | Sabry ............... G01J 3/0256 356/452 |

FOREIGN PATENT DOCUMENTS

| DE | 10145912 A1 | 5/2002 |
| WO | 2006092052 A1 | 9/2006 |
| WO | 2011069013 A1 | 6/2011 |

OTHER PUBLICATIONS

Byeong Ha Lee et al., "Interferometric Fiber Optic Sensors," Sensors 2012, 12, pp. 2467-2486, ISSN 1424-8220 (Feb. 23, 2012).

(Continued)

*Primary Examiner* — Hwa Andrew Lee
(74) *Attorney, Agent, or Firm* — Karceski IP Law, PLLC (57) ABSTRACT

An optical sensor system includes an optical sensor arrangement that includes a Fabry-Perot structure having two reflective surfaces spaced apart at a distance from each other. A spectral acquisition arrangement acquires successive spectral responses from the optical sensor arrangement during successive time intervals. A spectral analysis arrangement detects a periodicity in at least one of the successive spectral responses that have been acquired. The spectral analysis arrangement further detects a phase evolution of the periodicity throughout the successive spectral responses. The phase evolution of the periodicity provides a relatively precise measurement of a variation in an optical path length between the two reflective surfaces of the Fabry-Perot structure. A variation in a physical quantity can cause the variation in the optical path length. Accordingly, a relatively precise measurement of the physical quantity can be achieved.

7 Claims, 6 Drawing Sheets

(56) References Cited

OTHER PUBLICATIONS

Goertzel, Gerald, "An Algorithm for the Evaluation of Finite Trigonometric Series," American Mathematical Monthly, vol. 65, No. 1, pp. 34-35 (Jan. 1958).
International Search Report dated Feb. 15, 2017, for International Patent Application No. PCT/EP2016/076896.

* cited by examiner

OPTICAL SENSOR SYSTEM WITH SPECTRAL ANALYSIS ARRANGEMENT DETECTING A PERIODICITY IN A SPECTRAL RESPONSE OF A FABRY-PEROT STRUCTURE

CROSS-REFERENCE TO RELATED APPLICATION(S)

This is a National Stage Entry into the United States Patent and Trademark Office from International PCT Patent Application No. PCT/EP2016/076896, having an international filing date of Nov. 7, 2016, which relies for priority on European Patent Application No. 15193443.7, filed on Nov. 6, 2015, the entire contents of both of which are incorporated herein by reference.

FIELD OF THE INVENTION

An aspect of the invention relates to an optical sensor system. The optical sensor system may be used, for example, for measuring at least one physical quantity, such as, for example: vibration, strain, temperature, pressure, sound, and elongation (stretch), displacement, velocity, acceleration, temperature, refractive index, and, in particular, variations in such a physical quantity. Other aspects of the invention relate to an optical sensing method.

BACKGROUND OF THE INVENTION

An optical sensor system may comprise a Fabry-Perot structure. A Fabry-Perot structure comprises two reflective surfaces spaced apart a distance from each other.

The article entitled "Interferometric Fiber Optic Sensors" by Byeong Ha Lee et al. ISSN 1424-8220, describes a Fabry-Perot interferometer sensor. Interference occurs due to multiple superpositions of both reflected and transmitted beams at two parallel surfaces. A reflection or transmission spectrum of a Fabry-Perot interferometer can be described as a wavelength dependent intensity modulation of an input light spectrum. This wavelength dependent intensity modulation is mainly caused by an optical phase difference $\delta_{FPI}$ between two reflected or transmitted beams:

$$\delta_{FPI} = \frac{2\pi}{\lambda} n 2L$$

wherein $\lambda$ is the wavelength of incident light, n is the refractive index of cavity material or cavity mode, and L is a physical cavity length. In the thus modulated spectrum, maxima and minima occur at particular wavelengths when both beams are in phase and out-of-phase, respectively. A perturbation may cause a variation of an optical path length difference in the interferometer and thus a variation of the optical phase difference $\delta_{FPI}$. For example, applying longitudinal strain to the Fabry-Perot interferometer sensor, changes the physical cavity length L or the refractive index n of the cavity material, or both. The variation of the optical phase difference $\delta_{FPI}$ causes a shift of the reflection and transmission spectrum of the Fabry-Perot interferometer sensor. By measuring this spectral shift, the longitudinal strain applied on the Fabry-Perot interferometer sensor can be quantitatively obtained.

International patent application published under number WO 2011/069013 A1 describes a spatial Fourier transform spectrometer that includes a Fabry-Perot interferometer having a gap that spatially varies in a direction orthogonal to the optical axis The Fabry-Perot interferometer creates an interference pattern from input light. A processor is configured to process an interference pattern image to determine information about the spectral content of the input light.

US patent application published under number US 2005/046862 A1 describes a fiber optic sensing device that uses a Fabry-Perot cavity to sense a physical parameter. The cavity modulates incident polychromatic light. The spectrum is analyzed in a signal processing unit which normalizes the spectrum and determines the phase of the modulated signal.

German patent application published under number DE 101 45 912 A1 describes a system in which a low coherence light of wide range is fed into a Fabry-Perot load cell having a measured clearance varied in response to physical quantities such as force and pressure or the like to modulate its wavelength.

International patent application published under number WO 2006/092052 A1 describes a Fabry-Perot optical sensor for sensing a parameter such as pressure or the like.

SUMMARY OF THE INVENTION

There is a need for a technique that allows achieving relatively precise measurements with an optical sensor system.

In order to better address this need, in accordance with an aspect of the invention, there is provided an optical sensor system as defined in claim 1, which is appended to the description.

Such an optical sensor system comprises an optical sensor arrangement that includes a Fabry-Perot structure having two reflective surfaces spaced apart at a distance from each other. A spectral acquisition arrangement acquires successive spectral responses from the optical sensor arrangement during successive time intervals. A spectral analysis arrangement detects a periodicity in at least one of the successive spectral responses that have been acquired. The spectral analysis arrangement further detects a phase evolution of the periodicity throughout the successive spectral responses. The phase evolution of the periodicity provides a relatively precise measurement of a variation in an optical path length between the two reflective surfaces of the Fabry-Perot structure. A variation in a physical quantity can cause the variation in the optical path length. Accordingly, a relatively precise measurement of the physical quantity can be achieved.

For the purpose of illustration, a detailed description of some embodiments of the invention is presented with reference to accompanying drawings.

DETAILED DESCRIPTION

Figure 1:
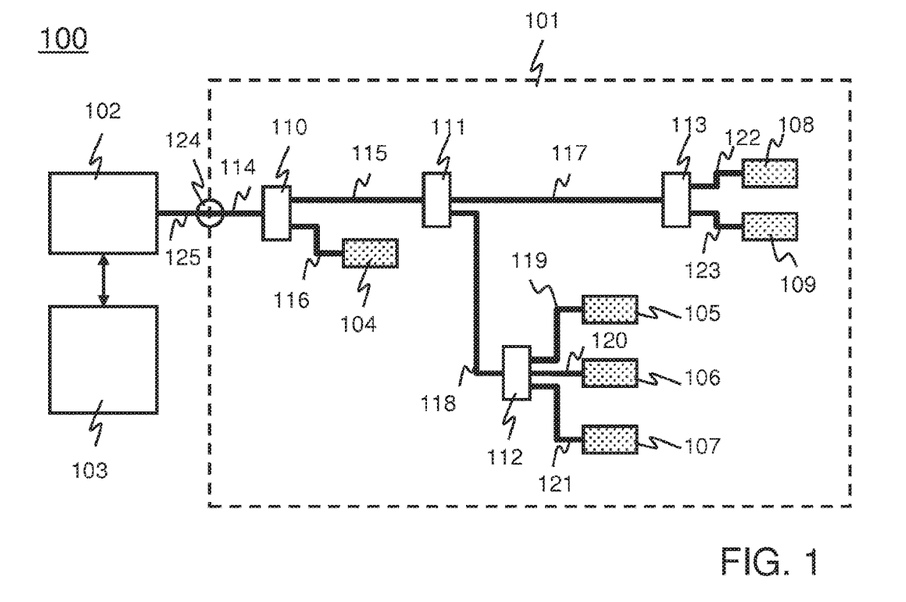
FIG. 1 is a block diagram of an optical sensor system.

FIG. 1 schematically illustrates an optical sensor system 100. The optical sensor system 100 is represented in a block diagram. The optical sensor system 100 may be used, for example, for measuring at least one of the following physical quantities: vibration, strain, temperature, pressure, sound, and elongation (stretch), displacement, velocity, acceleration, temperature, refractive index, and, in particular, variations in such a physical quantity.

The optical sensor system 100 comprises an optical sensor arrangement 101, a spectral acquisition arrangement 102, and a spectral analysis arrangement 103. The optical sensor arrangement 101 comprises a plurality of Fabry-Perot structures 104-109, six in this example. Other optical sensor arrangements may comprise a different number of Fabry-Perot structures, which may be disposed differently.

A Fabry-Perot structure comprises two reflective surfaces spaced apart at a distance from each other. A medium having a refractive index may be present between these two reflective surfaces. The distance at which the two reflective surfaces spaced apart and the refractive therein between define an optical path length between the two reflective surfaces. A physical quantity may affect the optical path length. That is, a physical quantity may affect the distance between the two reflective surfaces or may affect the refractive index of the medium therein between, or both. The Fabry-Perot structure can then be used as a sensor for measuring the physical quantity.

Figure 2:
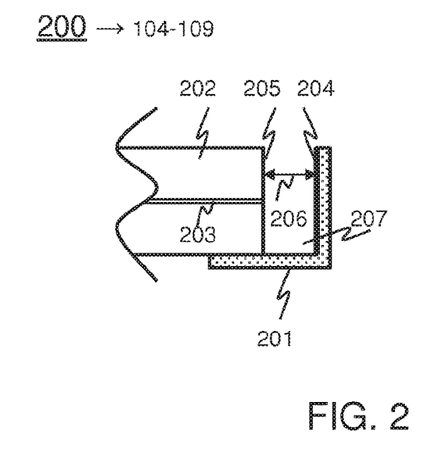
FIG. 2 is a schematic sectional view of a Fabry-Perot structure that can be used in the optical sensor system.

FIG. 2 schematically illustrates an embodiment 200 of a Fabry-Perot structure that can be used in the optical sensor system 100 illustrated in FIG. 1. FIG. 2 provides a sectional view of this embodiment 200. The embodiment 200 comprises a cantilever like element 201 that is fixed to an end portion 202 of optical fiber 202, which has a fiber core 203. The cantilever like element 201 comprises a reflective surface 204 that faces an end surface 205 of the optical fiber 202. The reflective surface 204 is at a distance 206 from the end surface 205 of the optical fiber 202. A medium 207 having refractive index is present between the reflective surface 204 and the end surface 205 of the optical fiber 202.

An interface thus exists between the end surface 205 of the optical fiber 202 and this medium 207. This interface may constitute another reflective surface depending on the refractive index of the medium 207 and that of the optical fiber 202, in particular that of the fiber core 203. The one and the other reflective surface thus are spaced apart from each other at a distance that corresponds with the distance 206 mentioned hereinbefore and indicated in FIG. 2.

Figure 3:
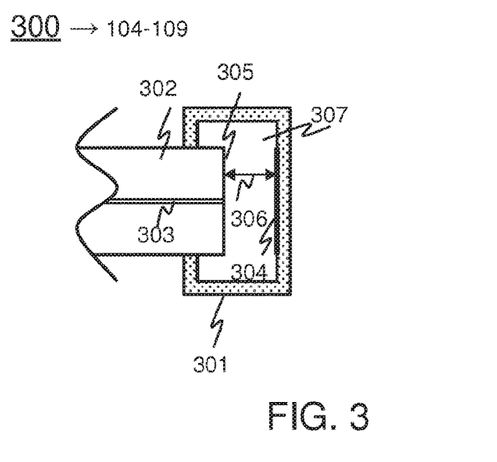
FIG. 3 is a schematic sectional view of another Fabry-Perot structure that can be used in the optical sensor system.

FIG. 3 schematically illustrates another embodiment 300 of a Fabry-Perot structure that can be used in the optical sensor system 100 illustrated in FIG. 1. FIG. 3 provides a sectional view of this embodiment 300. The embodiment 300 comprises a cap-like element 301 that is placed on an end portion of optical fiber 302, which has a fiber core 303. The cap-like element 301 may be fixed to the optical fiber 302. The cap-like element 301 may be manufactured in a manner similar to that in which so-called MEMS devices are manufactured, MEMS being an acronym for Micro-Electro-Mechanical Systems.

For the rest, the embodiment 300 illustrated in FIG. 3 has many similarities with the embodiment 200 illustrated in FIG. 2. That is, the cap-like element 301 comprises a reflective surface 304 that faces an end surface 305 of the optical fiber 302. The reflective surface 304 is at a distance 306 from the end surface 305 of the optical fiber 302. A medium 307 having a refractive index is present between the reflective surface 304 and the end surface 305 of the optical fiber 302. In this embodiment 300 too, an interface exists between the end surface 305 of the optical fiber 302 and this medium 307. This interface may thus also constitute a reflective surface depending on the refractive index of the medium 307 and that of the optical fiber 302, in particular that of the fiber core 303. The one and the other reflective surface are thus spaced apart from each other at a distance that corresponds with the distance 306 mentioned hereinbefore and indicated in FIG. 3.

The optical sensor arrangement 101 illustrated in FIG. 1 further comprises various optical splitters 110-113, various optical fibers 114-123, and an optical readout point 124. The optical splitters 110-113 and the optical fibers form a tree like structure that optically couples respective Fabry-Perot structures 104-109 to the spectral acquisition arrangement 102. Several branches may extend from an optical splitter, whereby an optical fiber forms a branch. A branch may extend toward another optical splitter or a Fabry-Perot structure. It should be noted that FIG. 1 illustrates one possible treelike structure among numerous other possible treelike structures.

An alternative optical sensor arrangement need not comprise a treelike structure. A Fabry-Perot structure can be formed within an optical fiber. Such a Fabry-Perot structure can be designated as an intrinsic Fabry-Perot structure. In contrast, the Fabry-Perot structures illustrated in FIGS. 2 and 3 can be designated as extrinsic Fabry-Perot structures. An alternative optical sensor arrangement can thus be obtained by replacing the tree like structure illustrated in FIG. 1 by an optical fiber that comprises a plurality of intrinsic Fabry-Perot structures. The optical fiber itself may then optically couple respective intrinsic Fabry-Perot structures comprised therein to a spectral acquisition arrangement.

Figure 4:
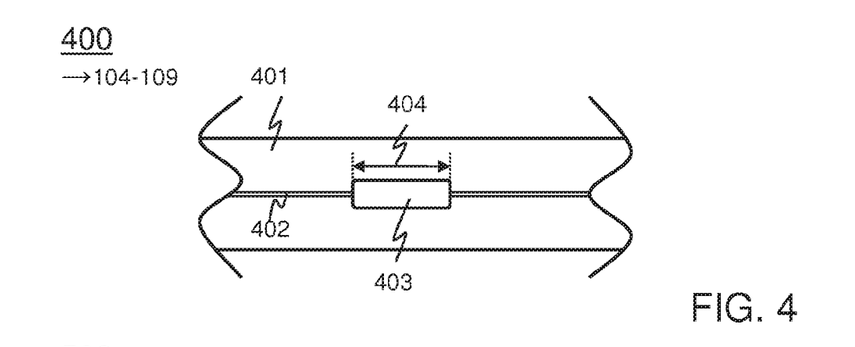
FIG. 4 is a schematic sectional view of an intrinsic Fabry-Perot structure that can be used in an alternative optical sensor system.

FIG. 4 schematically illustrates an embodiment 400 of an intrinsic Fabry-Perot structure that can be used in an alternative optical sensor system. FIG. 4 provides a sectional view of this embodiment 400. In the embodiment 400, an optical fiber 401, which has a fiber core 402, comprises a local structural modification 403. The local structural modification 403 interrupts, in effect, the fiber core 402 as schematically illustrated in FIG. 3. The local structural modification 403 has a length 404 extending, between two opposite ends that interface with the optical fiber core 402. Accordingly, one interface exists at one of the two ends and another interface at the other end. The one and the other interface constitute reflective surfaces if the local structural modification 403 has a refractive index that sufficiently differs from that of the fiber core 402. The one and the other reflective surface are spaced apart from each other at a distance that corresponds with the length 404 of the local structural modification mentioned hereinbefore and indicated in FIG. 4.

Figure 5:
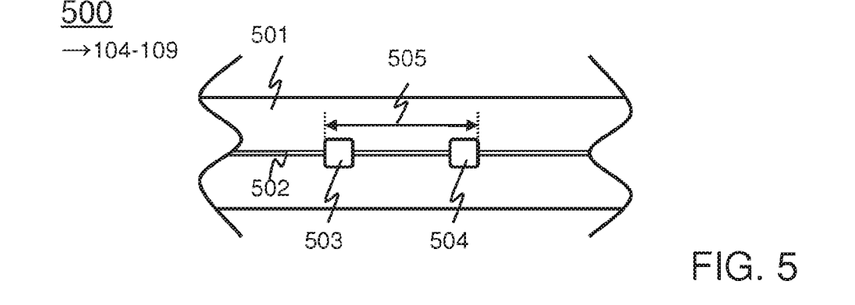
FIG. 5 is a schematic sectional view of another intrinsic Fabry-Perot structure that can be used in an alternative optical sensor system.

FIG. 5 schematically illustrates another embodiment 500 of an intrinsic Fabry-Perot structure that can be used in an alternative optical sensor system. FIG. 5 provides a sectional view of this embodiment 500. In the embodiment 500, an optical fiber 501, which has a fiber core 502, comprises a pair of relatively small local structural modifications 503, 504 that are spaced apart at a distance 505. These local structural modifications 503, 504 will be referred to as point-like structural modifications 503, 504 hereinafter for reasons of convenience and clarity. One point-like structural modification 503 interfaces with a main portion of the fiber core 502. The other structural point-like structural modification 504 interfaces with another main portion of the fiber core 502. Accordingly, two interfaces exist that may constitute reflective surfaces if the one and the other point-like structural modification 503, 504 each have a refractive index that sufficiently differs from that of the fiber core 502. The reflective surfaces are spaced apart from each other at a distance that corresponds with the distance 505 mentioned hereinbefore and indicated in FIG. 5.

The following remarks apply to each of me the embodiments 200-500 illustrated in FIGS. 2 to 5. The distance 206, 306, 404, 505 between the reflective surfaces can be defined in a manufacturing process. The manufacturing process may allow for producing different specimens having different distances between their two reflective surfaces.

A Fabry-Perot structure, whether extrinsic or intrinsic, has a spectral response that is typically characterized by an amplitude versus wavelength profile that has a sinusoidal shape. This sinusoidal amplitude versus wavelength profile has a periodicity, that depends on the optical path length between the two reflective surfaces of the Fabry-Perot structure. It should be noted that, in the context of the optical sensor arrangement 101, illustrated in FIG. 1, the term "spectral response" may apply to light reflected by a Fabry-Perot structure. In a different arrangement, a spectral response may apply to light that has travelled though a Fabry-Perot structure.

Figure 6:
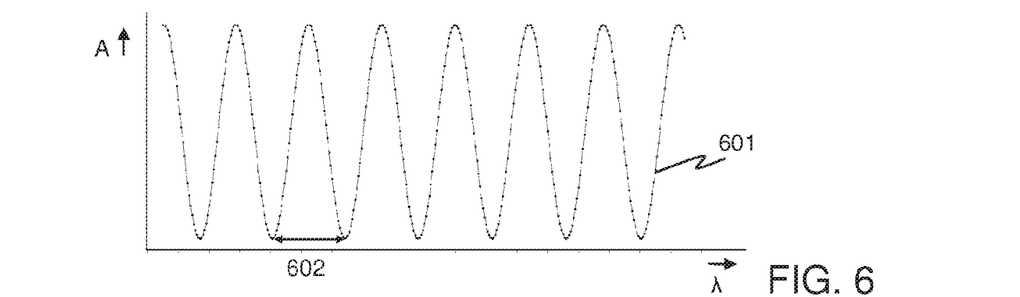
FIG. 6 is an amplitude versus wavelength diagram of a spectral response of a Fabry-Perot structure that has two reflectively surfaces 250 µm spaced apart.
Figure 7:
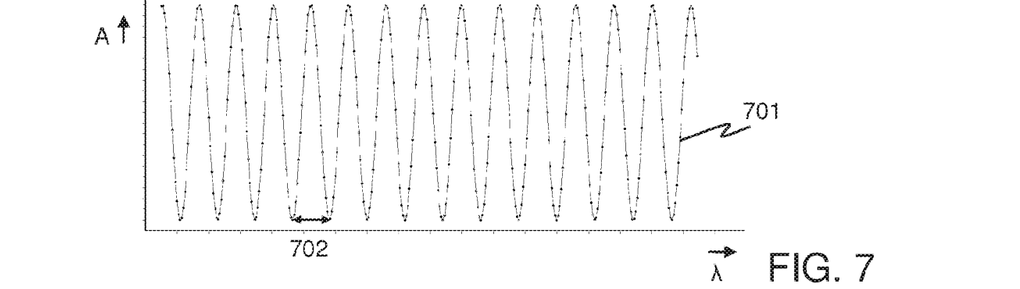
FIG. 7 is an amplitude versus wavelength diagram of a spectral response of another Fabry-Perot structure that has two reflectively surfaces 500 µm spaced apart.
Figure 8:
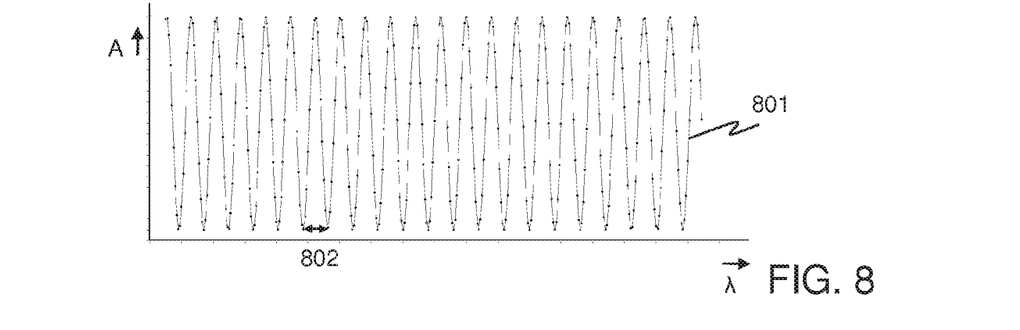
FIG. 8 is an amplitude-wavelength diagram of a spectral response of yet another Fabry-Perot structure that has two reflectively surfaces 750 nm spaced apart.

FIGS. 6, 7, and 8 schematically illustrate three respective spectral responses of three respective Fabry-Perot structures. Each of these figures is amplitude versus wavelength diagram that has a vertical axis, which represents amplitude A, and a horizontal axis, which represents wavelength λ. In these examples, the horizontal axis ranges from 1528 nm to 1564 nm. In the three respective Fabry-Perot structures, the two reflective surfaces are spaced apart at three respective distances: 250 µm, 500 µm, and 750 µm. The medium between the two reflective surfaces is the same for the three respective Fabry-Perot structures. The medium may be air in this example.

FIG. 6 illustrates the spectral response of the Fabry-Perot structure wherein the distance between the two reflective surfaces is 250 µm. The spectral response comprises a sinusoidal component 601. The sinusoidal component 601 corresponds with an amplitude versus frequency profile, or rather an amplitude versus wavelength profile. The sinusoidal component 601 can be regarded as a wavelength fingerprint of the Fabry-Perot structure concerned. The wavelength fingerprint has a relatively low periodicity 602. This periodicity 602 is approximately 4.8 nm: a distance along the horizontal axis between two equal adjacent phases in this profile corresponds with a wavelength difference of approximately 4.8 nm. The distance between the two reflective surfaces, which is 250 µm, determined the periodicity 602 in the spectral response illustrated in FIG. 6.

FIG. 7 illustrates the spectral response of another Fabry-Perot structure wherein the distance between the two reflective surfaces is 500 µm. The spectral response comprises a sinusoidal component 701 that has a median periodicity 702. This periodicity 702 is approximately 2.4 nm: a distance along the horizontal axis between two equal adjacent phases in this profile corresponds with a wavelength difference of approximately 2.4 nm.

FIG. 8 illustrates the spectral response of yet another Fabry-Perot structure wherein the distance between the two reflective surfaces is 750 µm. The spectral response comprises a sinusoidal component 801 that has a relatively high periodicity 802. This periodicity 802 is approximately 1.6 nm: a distance along the horizontal axis between two equal adjacent phases in this profile corresponds with a wavelength difference of approximately 1.6 nm.

Figure 9:
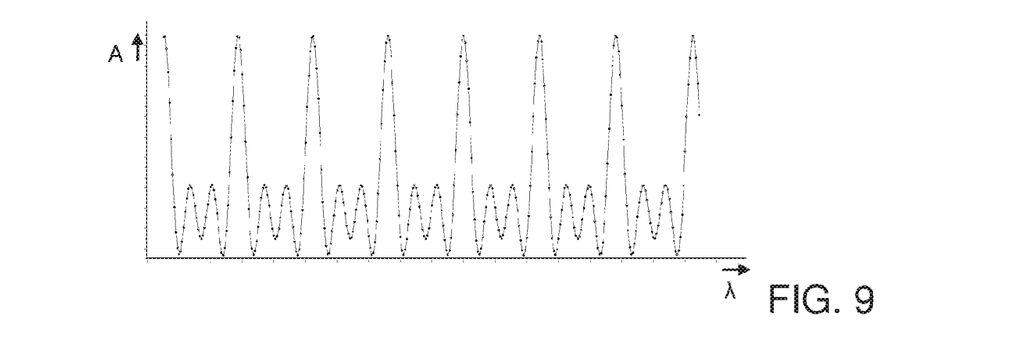
FIG. 9 is an amplitude-wavelength diagram of a spectral response of an optical sensor arrangement that comprises three respective Fabry-Perot structures having three respective spectral responses as illustrated in FIGS. 6, 7, and 8.

FIG. 9 schematically illustrates a spectral response of an optical sensor arrangement that comprises the three respective Fabry-Perot structures mentioned hereinbefore of which the respective spectral responses are illustrated in FIGS. 6, 7, and 8. The spectral response of the optical sensor arrangement is a combination of the three respective spectral responses 601, 701, 801 of the three respective Fabry-Perot structures. The optical sensor arrangement illustrated in FIG. 1 may thus have this spectral response if, for example, the following applies. Fabry-Perot structure 105 has a spectral response as illustrated in FIG. 6, Fabry-Perot structure 106 has a spectral response as illustrated in FIG. 7, and Fabry-Perot structure 107 has a spectral response as illustrated in FIG. 8. The other Fabry-Perot structures 104, 108, and 109 are omitted, or deactivated.

In the optical sensor arrangement 101 illustrated in FIG. 1, respective Fabry-Perot structures 104-109 may have respective optical path lengths and thus respective spectral responses. This can be the case if, for example, respective Fabry-Perot structures 104-109 have respective distances at which their two reflective surfaces are spaced apart, while the medium may be the same. The optical sensor arrangement 101 has a spectral response that corresponds with a combination of the respective spectral responses of the respective Fabry-Perot detectors in the optical sensor arrangement 101. The same may apply to an alternative optical sensor arrangement.

Figure 10:
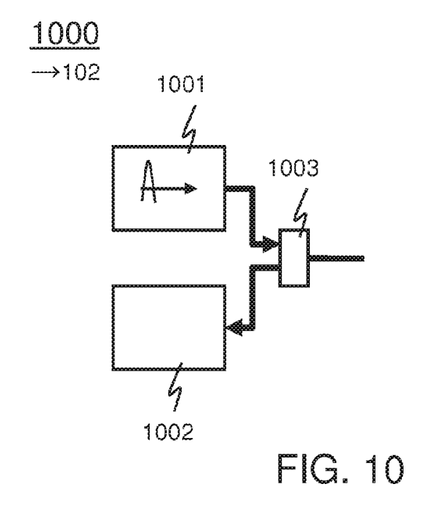
FIG. 10 is a block diagram of a spectral acquisition arrangement that can be used in the optical sensor system.

FIG. 10 schematically illustrates an embodiment 1000 of the spectral acquisition arrangement 102 in the optical sensor system 100 illustrated in FIG. 1. This embodiment 1000 is represented in a block diagram. The embodiment 1000 comprises a tunable light source 1001, a light intensity detector 1002, and an optical coupler 1003. The tunable light source 1001 may be in the form of, for example, a high speed scanning laser. The light intensity detector 1002 may be in the form of, for example, a wideband photodiode.

The embodiment 100 of the spectral acquisition arrangement 102 illustrated in FIG. 10 may operate as follows. The tunable light source 1001 provides narrowband light at a wavelength that may be swept through a wavelength range. A wavelength sweep covers a time interval during which the wavelength monotonously varies with time from one boundary of the wavelength range to another boundary of the wavelength range. An instant in the time interval of the wavelength sweep is thus uniquely associated with a wavelength. The wavelength range through which the tunable light source 1001 sweeps may be relatively broad in the order of, for example, tens to hundreds of nanometers. The wavelength range may have a mean wavelength of, for example, 1550 or 1310 nanometer (nm). The wavelength range may cover a so-called C-band, between, for example, 1529 and 1563 nm.

The optical coupler 1003 directs the narrowband light from the tunable light source 1001 to the optical readout point 124 of the optical sensor arrangement 101 illustrated in FIG. 1. The narrowband light is thus injected in the optical sensor arrangement 101. The optical coupler 1003 directs reflected light from the optical sensor arrangement 101 to the light intensity detector 1002. The reflected light, which has a given wavelength at a given instant, has a level of intensity that depends on the amplitude of the spectral response of the optical sensor arrangement 101 at that given wavelength.

The light intensity detector 1002 detects the level of intensity of the reflected light from the optical sensor arrangement 101. When the wavelength sweep is carried out, the level of intensity varies with time during the time interval of the sweep according to the spectral response of the optical sensor arrangement 101. The light intensity detector 1002 provides an output signal that, during the time interval, has an amplitude versus time profile that can be mapped to an amplitude versus wavelength profile. This amplitude versus wavelength profile corresponds with the spectral response of the optical sensor arrangement 101 in the wavelength range. The embodiment 1000 illustrated in FIG. 10 has thus acquired a spectral response of the optical sensor arrangement 101 in a time interval that corresponds with that of the wavelength sweep.

Figure 11:
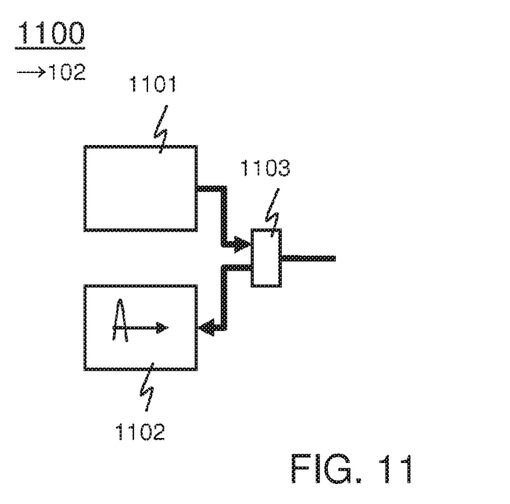
FIG. 11 is a block diagram of another spectral acquisition arrangement that can be used in the optical sensor system.

FIG. 11 schematically illustrates another embodiment 1100 of the spectral acquisition arrangement 102 in the optical sensor system 100 illustrated in FIG. 1. This embodiment 1100 is represented in a block diagram. The embodiment 1100 comprises a broadband light source 1101, a spectrometer 1102, and an optical coupler 1103. The broadband light source 1101 may be in the form of, for example, a so-called super luminescent diode (SLD) or amplified spontaneous emission source (ASE). The spectrometer 1102 may comprise, for example, a diode array having 512 to 4096 elements.

The embodiment 1100 illustrated in FIG. 11 may operate as follows. The broadband light source 1101 provides broadband light over a wavelength range that is relatively broad. For example, in case an amplified spontaneous emission source is used, the wavelength range may be comparable with that through which a high speed scanning laser can sweep.

The optical coupler 1103 operates in a fashion similar to that of the optical coupler 1003 described hereinbefore. That is, the optical coupler 1103 directs the broadband light from the broadband light source 1101 to the optical readout point 124 of the optical sensor arrangement 101 illustrated in FIG. 1. The broadband light is injected in the optical sensor arrangement 101. The optical coupler directs reflected light from the optical sensor arrangement 101 to the spectrometer 1102. The reflected light, which also covers the relatively broad frequency range, has a spectrum that depends on the spectral response of the optical sensor arrangement 101.

The spectrometer 1102 detects the spectrum of the reflected light from the optical sensor arrangement 101. This detected spectrum may correspond with the spectral response of the optical sensor arrangement 101 if the following condition is true: the broadband light that the broadband light source 1101 provides has a relatively flat spectrum in the wavelength range. In practice, the broadband Light may have a non-flat spectrum. In that case, the detected spectrum will be a combination of the spectral response of the optical sensor arrangement 101 and the non-flat spectrum of the broadband light. Nonetheless, the detected spectrum may sufficiently accurately represent the spectral response of the optical sensor arrangement 101. Moreover, the non-flat spectrum of the broadband light may be compensated for if this spectrum is sufficiently precisely known.

The embodiment 1100 illustrated in FIG. 11 has thus acquired a spectral response of the optical sensor arrangement 101. This spectral acquisition may cover an interval of time that corresponds with a period of time that the spectrometer 1102 may require to detect the spectrum of the reflected light.

In the optical sensor system 100 illustrated in FIG. 1, the spectral acquisition arrangement 102 thus may acquire successive spectral responses from the optical sensor arrangement 101 during successive time intervals. These successive spectral responses may differ from each other if, for example, the spectral response of a Fabry-Perot structure changes due to variations in the optical path length between its two reflective surfaces. These variations may be induced by variations of a physical quantity that affects the Fabry-Perot structure and, more specially, the optical path length between its two reflective surfaces. For example, variations in strain, pressure, and temperature may directly affect the optical path length. Variations in the refractive index of the medium between its two reflective surfaces may also directly affect the optical path length. Variations in other physical quantities may indirectly affect the Fabry-Perot structure because, for example, these cause variations in at least one of the aforementioned physical quantities.

Figure 12:
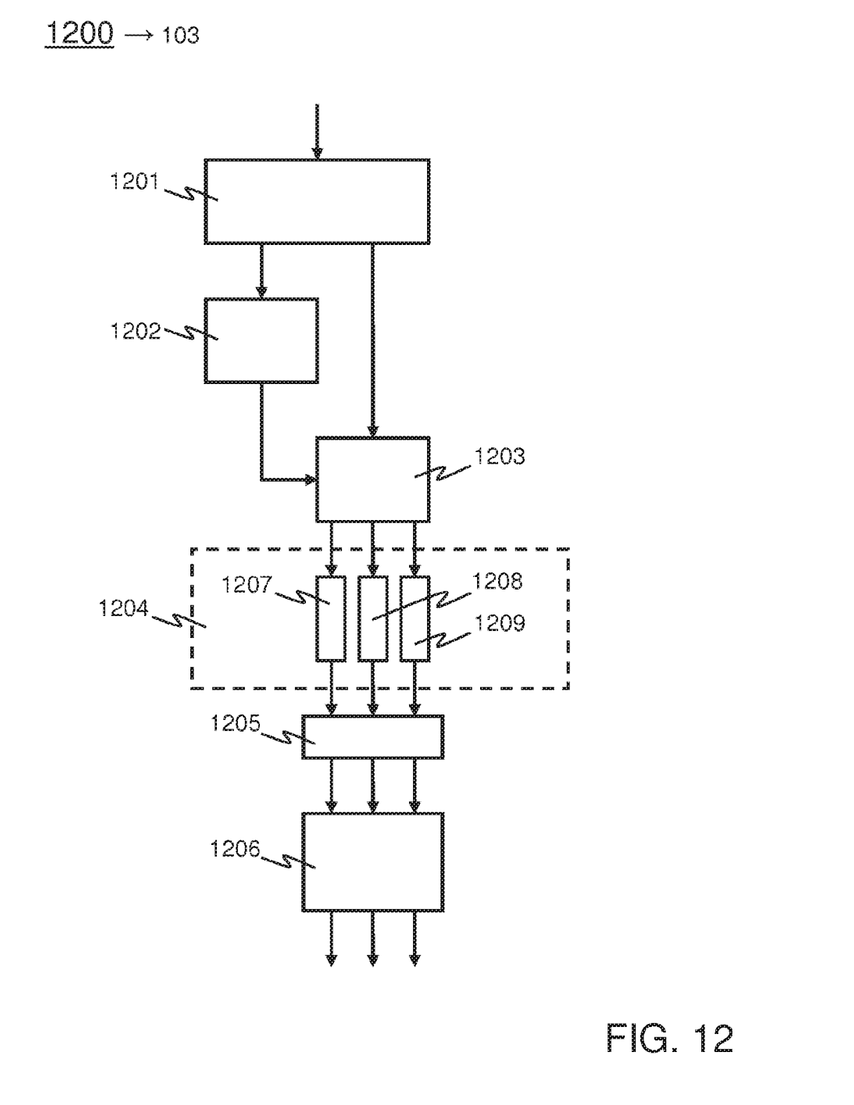
FIG. 12 is a block diagram of a spectral analysis arrangement that can be used in the optical sensor system.

FIG. 12 schematically illustrates an embodiment 1200 of the spectral analysis arrangement 103 illustrated in FIG. 1, which can measure a physical quantity on the basis of the successive spectral responses that the spectral acquisition arrangement 102 has acquired. The embodiment 1200 of the spectral analysis arrangement 103 is represented in a block diagram. The embodiment 1200 comprises various functional modules: a Fourier transform module 1201, a peak detection module 1202, a phase data extraction module 1203, an array of buffers 1204, a phase unwrapping module 1205, and a measured data output module 1206.

An embodiment of the Fourier transform module 1201 may be hardware-based or software-based. In a hardware-based implementation, the Fourier transform module 1201 may comprise programmable circuits, such a field programmable gate array (FPGA), or may comprise dedicated circuits, such as an application-specific integrated circuit (ASIC), or both. In a software-based implementation, the Fourier transform module 1201 may comprise an instruction execution device with a memory comprising a set of instructions. The set of instructions defines operations that the Fourier transform module 1201 carries out, which will be described hereinafter. The aforementioned remarks equally apply to other functional modules: the peak detection module 1202, the phase data extraction module 1203, the phase unwrapping module 1205, and the measured data output module 1206.

FIG. 12 can also be regarded as schematically representing, at least partially, a method that is carried out on the successive spectral responses that the spectral acquisition arrangement 102 has acquired. A functional module, or a combination of functional modules, can be regarded as representing a step of the method. For example, the Fourier transform module 1201 can be regarded as representing Fourier transform step, the peak detection module 1202 can be regarded as representing a peak detection step, and so on.

The Fourier transform module 1201 applies a Fourier transform to the successive spectral responses that the spectral acquisition arrangement 102 has acquired. The Fourier transform is complex so that the Fourier transform module 1201 provides an amplitude representation and a phase representation of the Fourier transform of a spectral response. The Fourier transform module 1201 thus provides successive amplitude representations and successive phase representations of successive Fourier transformed spectral responses that have been acquired. An amplitude representation of a Fourier transformed spectral response is uniquely associated with a phase representation of that same Fourier transformed spectral response.

Figure 13:
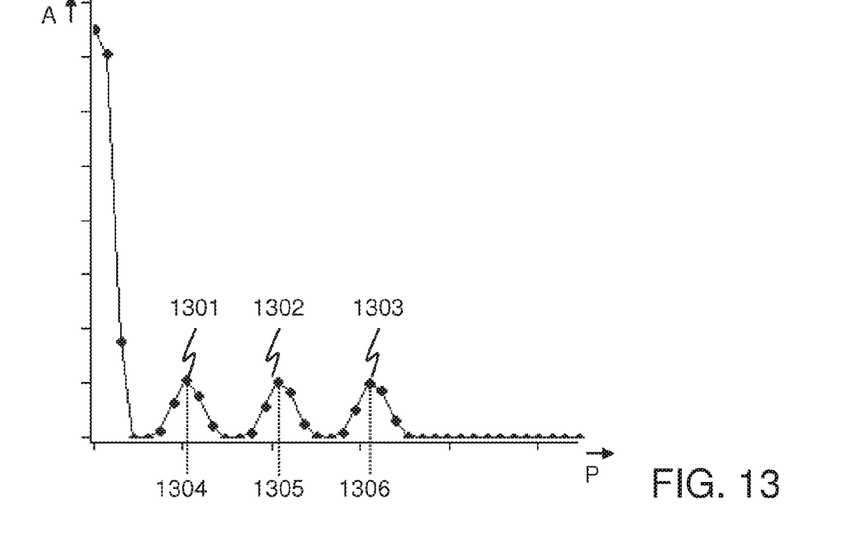
FIG. 13 is an amplitude versus periodicity diagram of an amplitude representation of the Fourier transform of the spectral response illustrated in FIG. 9.

FIG. 13 illustrates an amplitude representation of the Fourier transform of the spectral response illustrated in FIG. 9. This figure is an amplitude versus periodicity diagram that has a vertical axis, which represents amplitude A, and a horizontal axis, which represents periodicity P. The amplitude representation of the Fourier transform of the spectral response comprises three respective peaks 1301, 1302, 1303 that occur at three respective locations 1304, 1305, 1306. These three respective peaks 1301, 1302, 1303 relate to the three respective spectral responses 601, 701, 801 illustrated in FIGS. 6, 7 and 8 of the three respective Fabry-Perot structures mentioned hereinbefore.

In more detail, a first peak 1301 is due to the sinusoidal component 601 illustrated in FIG. 6, which is present in the spectral response illustrated in FIG. 9. The first peak 1301 occurs at a first location 1304 that, on the horizontal axis, corresponds with the relatively low periodicity 602 of this sinusoidal component 601. A second peak 1302 is due to the sinusoidal component 701 illustrated in FIG. 7, which is also present in the spectral response illustrated in FIG. 9. The second peak 1302 occurs at a second location 1305 that, on the horizontal axis, corresponds with the median periodicity 702 of this sinusoidal component 1306. A third peak 1303 is due to the sinusoidal component 801 illustrated in FIG. 8, which is also present in the spectral response illustrated in FIG. 9. The third peak 1303 occurs at a third location 1306 that, on the horizontal axis, corresponds with the relatively high periodicity 802 of this sinusoidal component 801.

In general, the following holds for an optical sensor arrangement that comprises respective Fabry-Perot structures having respective optical path lengths between their reflective surfaces. A spectral response of the optical sensor arrangement comprises respective sinusoidal components that have respective periodicities. Consequently, an amplitude representation of a Fourier transform of the spectral response of the optical sensor arrangement comprises respective peaks at respective locations that correspond with these respective periodicities.

A peak in the amplitude representation of a Fourier transformed spectral response may thus uniquely be associated with a Fabry-Perot structure in the optical sensor arrangement. The peak occurs at a location on the horizontal axis that corresponds with a periodicity of a sinusoidal component in the spectral response. The peak may thus uniquely be associated with a Fabry-Perot structure having a nominal spectral periodicity that is closest to the spectral periodicity that corresponds with the location of the peak. The nominal spectral periodicity is defined by a nominal optical path length. Such a unique association can be made if respective Fabry-Perot structures have sufficiently different respective nominal optical path lengths between their two reflective surfaces. Sufficiently different means that the respective optical path lengths differ to an extent that exceeds changes that may occur in these respective optical path lengths in practical measurement conditions.

The location of the peak represents a measured optical path length between two reflective surfaces of the Fabry-Perot structure with which the peak is associated. This measured optical path length may thus differ from the nominal optical path length optical path length due to a physical quantity that affects the optical path length. The measured optical path length may convey information about this physical quantity, in particular static information. This static information may be, for example, a value that the physical quantity has, which is valid for the time interval in which the spectral response was acquired. However, this static, DC-like measurement of the physical quantity is relatively imprecise. For example, a precision in order of a few micrometers (μm) may be achieved.

The peak detection module 1202 illustrated in FIG. 12 identifies one or more respective locations where one or more respective peaks occur in an amplitude representation of a Fourier transformed spectral response that has been acquired. The peak detection module 1202 may carry out this peak detection for each of the successive amplitude representations that the Fourier transform module 1201 provides. In that case, the peak detection module 1202 tracks, in effect, a movement of a peak throughout the successive amplitude representations. Alternatively, the peak detection module 1202 may apply the peak detection to a single amplitude representation among the successive amplitude representations that the Fourier transform module 1201 provides. In general, the peak detection module 1202 provides peak location data that indicates one or more respective locations of one or more respective peaks associated with one or more respective Fabry-Perot structures.

The phase data extraction module 1203 receives the successive phase representations that the Fourier transform module 1201 provides. The phase data extraction module 1203 further receives the peak location data from the peak detection module 1202. As explained hereinbefore, the peak location data for a phase representation may have been derived from an amplitude representation that is associated with the phase representation, both representations being based on the same spectral response. In such an embodiment, the peak location data is updated with each subsequent phase representation. In other embodiments, the peak location data may be updated less frequently. Alternatively, the peak location data may be derived from, for example, a single amplitude representation among the successive amplitude representations, as explained hereinbefore. In such an embodiment, the peak location data is static and the same for each of the successive phase representations.

The phase data extraction module 1203 extracts phase data that is present in a phase representation at a location where a peak occurs as indicated by the peak location data. This local phase data is thus associated with the same Fabry-Perot structure as the one with which the peak is associated. The local phase data that is extracted may comprise phase data at exactly the location where the peak occurs. The local phase data may further comprise phase data at one or more adjacent locations. That is, the local phase data that is extracted may cover a range of locations that includes the location where the peak occurs. The local phase data may be a weighted average of the phase data in this range of locations.

For example, a phase representation of a Fourier transform of a spectral response may be in the form of an array of respective phase values at respective positions in the array. The respective positions correspond with respective periodicities of respective sinusoidal components. A phase value at a position thus relates to a periodicity that corresponds with this position. The peak location data may indicate one or more positions in this array. Such an indicated position then corresponds to a periodicity for which the peak occurs in the amplitude representation, which may be in a similar form, namely an array of amplitude values. The phase data extraction module 1203 may extract the phase value at the indicated position. The data extraction module may further extract one or more further phase values at positions adjacent to the indicated position and, for example, make a weighted average.

The phase data extraction module 1203 may extract phase data for each respective location indicated by the peak location data. Accordingly, the phase data extraction module 1203 then provides respective local phase data associated with respective Fabry-Perot structures. Moreover, the phase data extraction module 1203 may carry out such a phase data extraction for each of the successive phase representations that the Fourier transform module 1201 provides. The phase data extraction module 1203 then provides a series of successive local phase data for a Fabry-Perot structure. The series of successive local phase data represent a phase evolution in the sinusoidal component that this Fabry-Perot structure produces in the successive spectral responses that have been acquired. The phase data extraction module 1203 may provide respective series of successive local phase data for respective Fabry-Perot structures that are present in the optical sensor arrangement.

Figure 14:
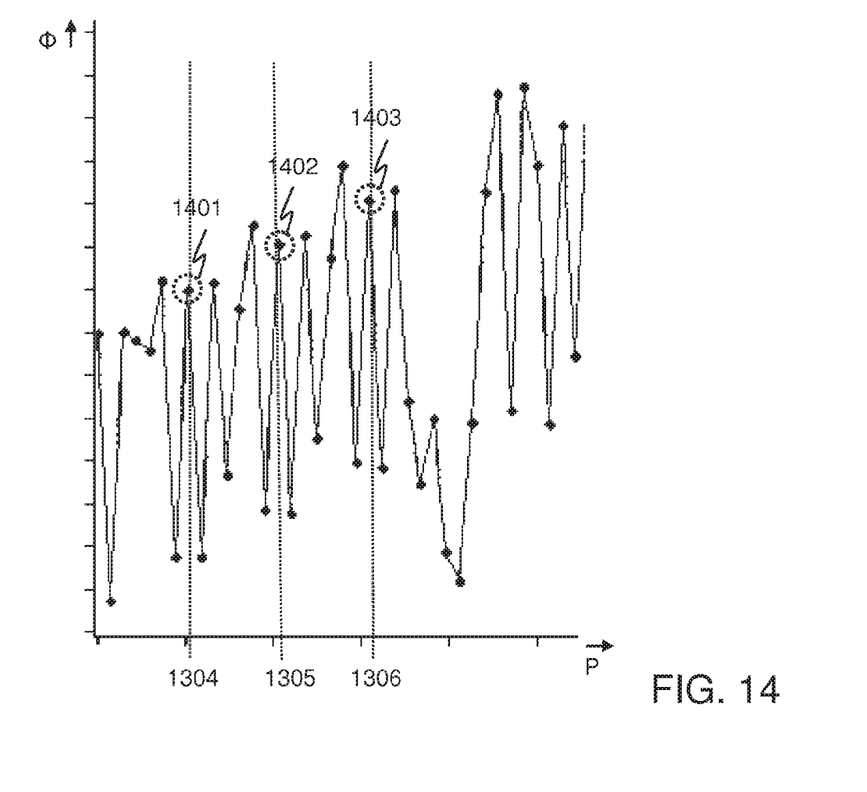
FIG. 14 is a phase versus periodicity diagram of a phase representation of the Fourier transform of the spectral response illustrated in FIG. 9.

FIG. 14 illustrates a phase representation of the Fourier transform of the spectral response illustrated in FIG. 9. This figure is a phase versus periodicity diagram that has a vertical axis, which represents phase Φ, and a horizontal axis, which represents periodicity P. The phase representation illustrated in FIG. 14 is associated with the amplitude representation illustrated in FIG. 13. That is, the Fourier transform module 1201 illustrated in FIG. 12 provides the amplitude representation illustrated in FIG. 13 and the phase representation illustrated in FIG. 14 on the basis of the spectral response illustrated in FIG. 9.

The peak detection module 1202 identifies the three respective locations 1304, 1305, 1306 where the three respective peaks 1301, 1302, 1303 occur in the amplitude representation illustrated in FIG. 13. The peak location data will thus indicate these three respective locations 1304, 1305, 1306, namely the first location 1304 where the first peak 1301 occurs, the second location 1305 where the second peak 1302 occurs, and the third location 1306 where the third peak 1303 occurs. These three respective locations are represented in FIG. 14.

The phase data extraction module 1203 may extract phase data 1401 from the phase representation illustrated in FIG. 14 at the first location 1301, which is indicated by the peak location data. The phase data extraction module 1203 may do the same for the second location 1302 and the third location 1303, which are indicated. The phase data extraction module 1203 then provides three respective local phase data data 1401, 1402, 1403 associated with the aforementioned three respective Fabry-Perot structures. The phase data extraction module 1203 may do the same for a subsequent phase representation in which the local phase data associated with a Fabry-Perot structure may differ from the local phase data data 1401, 1402, 1403 associated with the same Fabry-Perot structure in the phase representation illustrated in FIG. 14.

In the array of buffers 1204, a buffer is uniquely associated with a Fabry-Perot structure. The phase data extraction module 1203 stores local phase data that is associated with a Fabry-Perot structure in the buffer that is uniquely associated with this Fabry-Perot structure. For example, referring to FIG. 14, the phase data 1401 extracted at the first location 1301 constitutes local phase data that is associated with the Fabry-Perot structure wherein the distance between the two reflective surfaces is 250 μm. This local phase data 1401 may be stored in a first buffer 1207 that is associated with this 250 μm Fabry-Perot structure. The phase data 1402 extracted at the second location 1302 constitutes local phase data that is associated with the Fabry-Perot structure wherein the distance between the two reflective surfaces is 500 μm. This local phase data 1402 may be stored in a second buffer that is associated with this 500 μm Fabry-Perot structure. The phase data extracted 1403 at the third location 1303 constitutes local phase data that is associated with the Fabry-Perot structure wherein the distance between the two reflective surfaces is 750 μm. This local phase data 1403 may be stored in a third buffer that is associated with this 750 μM Fabry-Perot structure.

Let it be assumed that the Fourier transform module 1201, the peak detection module 1202, and the phase data extraction module 1203 have processed a series of successive spectral responses that have been acquired. A buffer in the array of buffers 1204 then comprises a series of successive local phase data associated with the Fabry-Perot structure with which the buffer is associated. As explained hereinbefore, this series of successive local phase data represents a phase evolution in the sinusoidal component that the Fabry-Perot structure concerned produces in the series of successive spectral responses that have been acquired. Once a series of successive spectral responses have been processed, respective buffers in the array of buffers 1204 may thus comprise respective series of successive local phase data associated with respective Fabry-Perot structures. A series of local phase data represents a phase evolution of a periodicity uniquely associated with a Fabry-Perot structure.

The phase unwrapping module 1205 may apply a modulo 2π unwrapping operation to a series of local phase data that is stored in a buffer. Local phase data that is present in a buffer may be expressed in modulo 2π format. As a result, a series of local phase data may then comprise 2π phase jumps, equivalent to 360° phase jumps, which are due to this format. These 2π/360° phase jumps thus do not represent an actual phase evolution. For example, the buffer may comprise four successive local phase data respectively expressing 330°, 350°, 10°, and 30° phase. In this example, a 2π/360° phase jump occurs between the two successive local phase data respectively expressing 350° and 10° phase. The phase unwrapping module 1205 will correct for this 2π/360° phase jump so that the four successive local phase data respectively express 330°, 350°, 370°, and 390° phase. The phase unwrapping module 1205 thus provides an unwrapped series of local phase data on the basis of a series of local phase data that is stored in a buffer.

An unwrapped series of local phase data, which is associated with a Fabry-Perot structure, represents a phase evolution in a series of successive Fourier transformed spectral responses at a location that is associated with the Fabry-Perot structure. This local phase evolution allows determining variations in the optical path length between the two reflective surfaces of the Fabry-Perot structure concerned. This is because a change in the optical path length produces a change in the periodicity of the sinusoidal component that characterizes the spectral response of the Fabry-Perot structure. In turn, a change in the periodicity causes a phase evolution in a series of Fourier transformed spectral responses. The phase evolution precisely reflects the change in the periodicity, which, in turn, precisely reflects a change in the optical path length.

The unwrapped series of local phase data may represent a phase evolution with relatively great precision which, in turn, allows determining variations in the optical path length with relatively great precision. This is because a relatively small change in the periodicity may produce a relatively significant phase change between two successive phase representations at the location that is associated with the Fabry-Perot structure concerned. Moreover, in a series of phase representations, a phase change will typically occur between each pair of adjacent phase representations, wherein one succeeds the other. This will then result in a relatively large phase change, at the location concerned, throughout the series of phase representations.

This phase evolution based manner of measuring variations in the optical path length between the two reflective surfaces of a Fabry-Perot structure can be significantly more precise than a peak shift based manner of measuring such variations. In the peak shift based manner of measuring, variations in the optical path length are detected and quantified on the basis of a series of amplitude representations of a series of Fourier transformed spectral responses. In this series of amplitude representations, variations in the optical path length between the two reflective surfaces of a Fabry-Perot structure cause a shift in the location of a peak that is associated with the Fabry-Perot structure concerned. In general, this shift will be relatively small and thus less precisely quantifiable. A precision in the order of micrometers (µm) may be achieved, whereas the phase evolution based manner of measuring may allow for achieving sub-nanometer precision.

The measured data output module 1206 may provide respective measured output data associated with respective Fabry-Perot structures. A measured output data may, represent a local phase evolution in successive phase representations of Fourier transformed spectral responses. The output data may further identify a Fabry-Perot structure that accounts for this local phase evolution. In a basic form, the output data may comprise, for example, an unwrapped series of successive local phase data as described hereinbefore and an indication of where this local phase data has been extracted from the successive phase representations. This indication of location can uniquely be mapped to an identifier of the Fabry-Perot structure concerned.

A measured output data allows determining with relatively great precision variations in a physical quantity that affects the Fabry-Perot structure concerned. This is because, as explained hereinbefore, a local phase evolution expresses with great precision variations in the optical path length between the two reflective surfaces of the Fabry-Perot structure concerned. The variations in the optical path length may then precisely be related to variations in a physical quantity of interest. This precise relation may be defined by means of, for example, calibration or theoretical calculation.

Accordingly, the optical sensor system 100 illustrated in FIG. 1 allows simultaneous measurement of one or more physical quantities at various locations in a multiplexed fashion and with relatively great precision. The same applies to other optical sensor systems that comprise at least one Fabry-Perot structure and that use a phase evolution based manner of measuring optical path length variations as described hereinbefore.

The embodiments described hereinbefore may be summarized as follows. In the optical sensor system 100, the optical sensor arrangement 101 comprises a Fabry-Perot structure 104 having two reflective surfaces spaced apart at a distance from each other. The spectral acquisition arrangement 102, which is coupled to optical sensor arrangement 101, is adapted to acquire successive spectral responses from the optical sensor arrangement during successive time intervals. The embodiment illustrated in FIG. 12 of the spectral analysis arrangement 103, is adapted to apply a Fourier transform to the successive spectral responses that have been acquired, so as to obtain, for a spectral response, an amplitude representation and a phase representation of the Fourier transform of the spectral response. This embodiment is further adapted to identify a location where a peak occurs in an amplitude representation and to extract, from successive phase representations, local phase data at a location corresponding to the location where the peak occurs, so as to obtain a series of successive local phase data representing a local phase evolution in the successive phase representations.

There are several factors that may affect a level of performance that can be achieved. One factor is phase stability of a spectral acquisition arrangement, such as the embodiment illustrated in FIG. 10. In this embodiment, there will be some phase jitter in the narrowband light that the tunable light source 1001 injects in the optical sensor arrangement 101. The smaller this phase jitter is, the more precise measurements will be. In the embodiment illustrated in FIG. 11, the phase stability of the spectrometer 1102 is a factor that will affect measurement precision.

Another factor that affects measurement precision is the wavelength range over which spectral responses are acquired. The wider this wavelength range is, the more precise measurements can be, assuming that phase stability is not affected by widening the wavelength range. In case a spectral response is acquired over a relatively wide wavelength range, the spectral response will comprise relatively many periods of a sinusoidal component. The greater the number of periods that are present in a spectral response, the finer the resolution is of the amplitude and phase representations of the Fourier transform of the spectral response. Moreover, the finer the resolution is, the greater the number of Fabry-Perot structures that an optical sensor arrangement may comprise, whereby respective peaks in an amplitude representation can uniquely be associated with respective Fabry-Perot structures.

Another aspect of performance is measurement bandwidth: a maximum frequency of variations that can be measured. The spectral acquisition arrangement may also affect the measurement bandwidth. In the embodiment illustrated in FIG. 10, the tunable light source 1001 carries out wavelength sweeps at a certain rate. The measurement bandwidth is limited to half this sweep rate. For example, in case this sweep rate is 5 kHz, the measurement bandwidth will be 2.5 kHz. In case the wavelength range over which the sweep is carried out is 100 nm, the light intensity detector 1002 may have a bandwidth of 5 MHz if a 200 pm resolution is required with 512 points for the Fourier transform. It should be noted that currently scanning lasers are available that can a sweep over a wavelength range of 100 nm with rate of 500 kHz.

In the embodiment illustrated in FIG. 11, the spectrometer 1102 may acquire spectral responses at a certain rate. The measurement bandwidth is limited to of this spectral acquisition rate. For example, in case the spectral acquisition rate is 5 kHz, the measurement bandwidth will be 2.5 kHz. In case the wavelength range over which the sweep is carried out is 100 nm, the spectrometer 1102 may comprise photo diodes that have a bandwidth of 10 MHz if a 50 pm resolution is required with 2048 points for the Fourier transform.

Another aspect of performance can be a maximum optical path length that a Fabry-Perot structure may have. Light that is injected in the optical sensor arrangement will have a certain coherence length. The coherence length may be a factor that sets a limit to the maximum optical path length. The greater the coherence length is, the greater the maximum optical path length is, assuming that there are no other limits.

However, another limiting factor may be a spectral resolution that the spectral acquisition arrangement can achieve. The greater the optical path length is of a Fabry-Perot structure, the higher the periodicity is of the amplitude versus frequency profile that the Perot structure produces in a spectral response. The spectral response is acquired with a certain resolution. In case the periodicity is relatively high with respect to this spectral resolution, the acquired spectral response may not represent the amplitude versus frequency profile with sufficient precision. In practice, the maximum optical path length may be an order of, for example, a few millimeters.

Yet another aspect of performance is that Fabry-Perot structures that are relatively close to each other may cause interference. Two Fabry-Perot structures at a relatively small distance from each other may, in effect, define a parasitic Fabry-Perot structure. The interference of such a parasitic Fabry-Perot structure may be relatively insignificant, and even negligible, if the distance between the two Fabry-Perot structures concerned is relatively large with respect to the coherence length of the light that is injected in the optical sensor arrangement. In practice, the coherence length may be in a range between, for example, 1 and 20 millimeter.

The aforementioned interference can be avoided by means of an optical fiber section in the form of, for example, a coil. Such a coiled optical fiber section constitutes a delay line. The coiled optical fiber section may be included in an optical path that exists between two Fabry-Perot structures that are relatively close to each other. The optical path may then have a length that is relatively large with respect to the coherence length of the light that is injected in the optical sensor arrangement.

Figure 15:
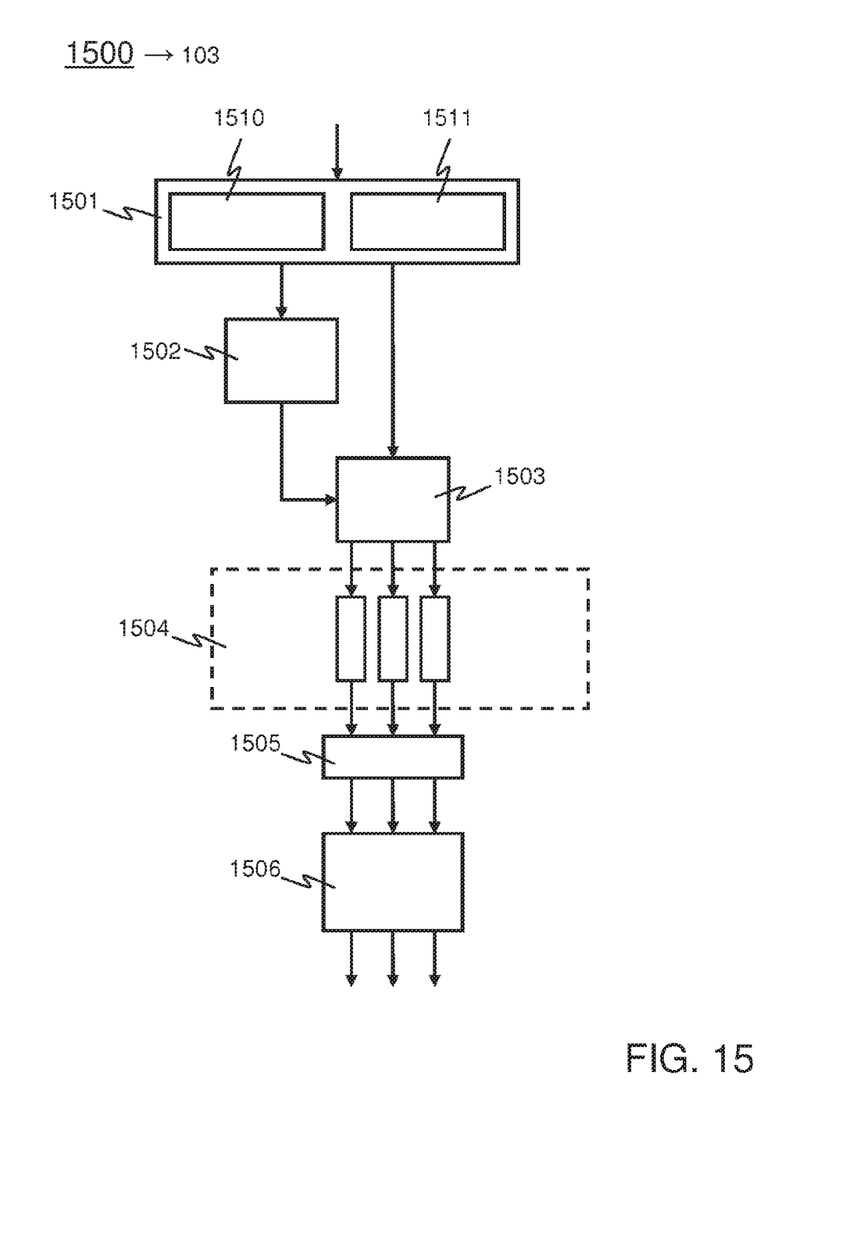
FIG. 15 is a block diagram of an alternative spectral analysis arrangement that can be used in the optical sensor system.

FIG. 15 schematically illustrates an alternative embodiment 1500 of the spectral analysis arrangement 103 illustrated in FIG. 1, which can measure a physical quantity on the basis of the successive spectral responses that the spectral acquisition arrangement 102 has acquired. The alternative embodiment 1500 of the spectral analysis arrangement 103 is represented in a block diagram. The alternative embodiment 1500 comprises various functional modules: an alternative Fourier transform module 1501, a peak detection module 1502, a phase data extraction module 1503, an array of buffers 1504, a phase unwrapping module 1505, and a measured data output module 1506. Any of these modules may be hardware-based or software-based, as mentioned hereinbefore with regard to the modules of the embodiment illustrated in FIG. 12. FIG. 15 can therefore also be regarded as schematically representing, at least partially, an alternative method that is carried out on the successive spectral responses that the spectral acquisition arrangement 102 has acquired.

The alternative Fourier transform module 1501 comprises a comprehensive transform module 1510 and a targeted transform module 1511. The comprehensive transform module 1510 may be adapted to carry out a Fourier transform similar to the Fourier transform module 1201 in the embodiment illustrated in FIG. 12 described hereinbefore. The targeted transform module 1511 may be adapted to carry out a Goertzel algorithm. The Goertzel algorithm allows efficiently calculating a specific term, or a specific set of terms, of a discrete Fourier transform. The Goertzel algorithm may therefore be regarded as a form of targeted Fourier transform, a transform that targets a particular frequency bin or a particular set of frequency bins. The Goertzel algorithm was first described in the article entitled "An Algorithm for the Evaluation of Finite Trigonometric Series" by Gerald Goertzel in the American Mathematical Monthly, Vol. 65, No. 1 (January, 1958), pp. 34-35.

The comprehensive transform module 1510 applies a Fourier transform to a first spectral response of a series of successive spectral responses that the spectral acquisition arrangement 102 has acquired. The Fourier transform provides an amplitude representation of the Fourier transform of the first spectral response. The Fourier transform may further provide a phase representation.

The peak detection module 1502 identifies one or more respective locations where one or more respective peaks occur in of the Fourier transform of the first spectral response. A peak in the amplitude representation of the Fourier transformed first spectral response may uniquely be associated with a Fabry-Perot structure in the optical sensor arrangement 101 as explained hereinbefore. The peak occurs at a location on the horizontal axis that corresponds with a periodicity of a sinusoidal component in the first spectral response that is characteristic of the Fabry-Perot structure concerned. The peak detection module 1502 thus provides periodicity indication data that indicates one or more respective periodicities in the first spectral response associated with one or more respective Fabry-Perot structures.

The targeted transform module 1511 may use the periodicity indication data for applying the Goertzel algorithm to a second spectral response in the series of successive spectral responses. A detected periodicity, which corresponds with a detected peak, may be used as a starting point for the Goertzel algorithm. The Goertzel algorithm may then calculate an amplitude representation and a phase representation of Fourier transform terms in the vicinity of the detected periodicity. This amplitude representation and phase representation is similar to what the Fourier transform module 1201 in the embodiment illustrated in FIG. 12 would have provided in the same vicinity. However, the Goertzel algorithm can provide this data in a more efficient manner and with greater precision.

More specifically, the Goertzel algorithm allows to locate the peak more precisely and thus to measure more precisely an optical path length between two reflective surfaces of the Fabry-Perot structure with which the peak is associated. This measured optical path length may convey information about this physical quantity, in particular static information, as explained hereinbefore. This static, DC-like measurement of the physical quantity can be relatively precise when using the Goertzel algorithm. For example, a precision in order of a few nanometers (nm) may be achieved. This may be advantageous in case, for example, a Fabry-Perot structure is used as a temperature sensor or an absolute pressure sensor.

The targeted transform module 1511 may apply the Goertzel algorithm several times to the second spectral response, focusing on a different detected periodicity each time that the Goertzel algorithm is applied. Accordingly, the targeted transform module 1511 may provide respective amplitude and phase data concerning Fourier transform terms in the vicinity of respective detected periodicities in the first second spectral response. The amplitude data may comprise updated information concerning peak locations, which corresponds to updated information about the detected periodicities. These periodicities may have shifted somewhat with respect to those in the first spectral response due to, for example, variations in one or more physical quantities that affect the optical path length of one or more of the Fabry-Perot structures in the optical sensor arrangement 101.

The targeted transform module 1511 may apply the Goertzel algorithm in a similar fashion to a third and subsequent spectral responses in the series of spectral responses. Let it be assumed that the Goertzel algorithm has been applied to an $N^{th}$ spectral response as described hereinbefore, N being an integer greater than 1. In this $N^{th}$ transform step, the Goertzel algorithm may thus have been applied for each previously detected periodicity. This provides updated information concerning the respective detected periodicities, which may be used as an input for applying the Goertzel algorithm to the $N+1^{th}$ spectral response.

The alternative Fourier transform module 1501 thus provides successive sets of phase data for successive spectral responses that have been acquired. A set of phase data that is provided on the basis of an acquired spectral response comprises respective phase data concerning respective detected periodicities that are present in the spectral response. Each phase data may be provided by applying the Goertzel algorithm as described hereinbefore. The first spectral response may form an exception to that. In case no a priori knowledge about periodicities is available, a comprehensive Fourier transform may be applied to the first spectral response to detect periodicities.

The successive sets of phase data may be processed by the array of buffers 1504, the phase unwrapping module 1505, and the measured data output module 1506. This may be done in manner similar to that in the embodiment illustrated in FIG. 12, as described hereinbefore, in which the array of buffers 1204, the phase unwrapping module 1205, and the measured data output module 1206 process the respective local phase data. It should be noted that the targeted transform module 1511, which implements the Goertzel algorithm, may directly provide a peak position and a phase value as output data for a periodicity in a spectral response. In that case, the peak detection module 1502 and the phase data extraction module 1503 could just pass this output data further and, in effect, may be superfluous.

Notes

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied in numerous types of products or methods related to measurements based on Fabry-Perot structures. For example, the invention may be applied in any type of domain, such as, for example, structure monitoring, energy industry, surveillance, seismic applications, oil and gas industry, and metrology. Acoustic transducer applications may include fiber optic geophones or hydrophones The invention may be implemented in numerous manners. For example, an optical sensor arrangement may comprise a single Fabry-Perot structure only. An optical sensor arrangement may also comprise a relatively large number of Fabry-Perot structure, such as, for example, tens of Fabry-Perot structures, which can be practically feasible.

There are numerous different wavelength ranges over which spectral responses can usefully be acquired. For example, a wavelength range may comprise a wavelength of 1.3 micrometer or 1.5 micrometer. A wavelength range may even comprise visible light.

There are various manners in which a periodicity in a spectral response can be detected and in which a phase evolution of the periodicity can be detected throughout successive spectral responses. For example, autocorrelation techniques may be used instead of, or in addition to transforms of the time-to-frequency type.

The term "Fabry-Perot structure" should be understood in a broad sense. The term may embrace any element or structure that has a spectral response comprising a sinusoidal component defined by an optical path length.

In general, there are numerous different ways of implementing the invention, whereby different implementations may have different topologies. In any given topology, a single module may carry out several functions, or several modules may jointly carry out a single function. In this respect, the drawings are very diagrammatic. There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the FIGS. may be implemented by means of one or more dedicated circuits, whereby a particular circuit topology defines a particular function.

There are numerous ways of storing and distributing a set of instructions, that is, software, which allows operating a system in accordance with the invention. For example, software may be stored in a suitable device readable medium, such as, for example, a memory circuit, a magnetic disk, or an optical disk. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. An optical sensor system, comprising:
an optical sensor arrangement comprising a Fabry-Perot structure having two reflective surfaces spaced apart at a distance from each other,
a spectral acquisition arrangement, coupled to the optical sensor arrangement, that acquires successive spectral responses from the optical sensor arrangement during successive time intervals, and
a spectral analysis arrangement, coupled to the spectral acquisition arrangement, that detects a periodicity in ones of the successive spectral responses and a phase evolution of the periodicity throughout the ones of the successive spectral responses by application of a transform of the time-to-frequency type to the ones of the successive spectral responses to obtain an amplitude representation and a phase representation for the ones of the successive spectral responses, identification of a location where a peak occurs in a first amplitude representation, extraction, from successive phase representations, of local phase data at locations corresponding to the location where the peak occurs in the first amplitude representation, and generation of a series of the local phase data representing a local phase evolution in the successive phase representations, thereby detecting the phase evolution of the periodicity throughout ones of the successive spectral responses.

2. An optical sensor system according to claim 1, wherein the transform of the time-to-frequency type comprises a Fourier transform.

3. An optical sensor system according to claim 1, wherein the transform of the time-to-frequency type comprises a Goertzel algorithm.

4. An optical sensor system according to claim 1, wherein the spectral analysis arrangement includes detection of a periodicity in a first spectral response and an update to the periodicity on the basis of the successive spectral responses that follow the first spectral response.

5. An optical sensor system according to claim 1, comprising a plurality of Fabry-Perot structures, whereby respective Fabry-Perot structures have respective distances at which the two reflective surfaces are spaced apart,
the spectral analysis arrangement includes detection of respective periodicities in at least one of the successive spectral responses and detection of respective phase evolutions of the respective periodicities throughout the successive spectral responses.

6. An optical sensing method that makes use of an optical sensor arrangement comprising a Fabry-Perot structure having two reflective surfaces spaced apart at a distance from each other, a spectral acquisition arrangement coupled to the optical sensor arrangement, and a spectral analysis arrangement coupled to the spectral acquisition arrangement, the optical sensing method comprising:
acquiring, by the spectral acquisition arrangement, successive spectral responses from the optical sensor arrangement during successive time intervals; and
detecting, by the spectral analysis arrangement, a periodicity in ones of the successive spectral responses and a phase evolution of the periodicity throughout the ones of the successive spectral responses by
applying a transform of the time-to-frequency type to the ones of the successive spectral responses to obtain an amplitude representation and a phase representation for the ones of the successive spectral responses,
identifying a location where a peak occurs in a first amplitude representation,
extracting, from successive phase representations, local phase data at locations corresponding to the location where the peak occurs in the first amplitude representation, and
generating a series of the local phase data representing a local phase evolution in the successive phase representations,
thereby detecting the phase evolution of the periodicity throughout ones of the successive spectral responses.

7. An article of manufacture comprising a computer usable medium having computer readable program code means embodied therein executable by an optical sensor system comprising an optical sensor arrangement that includes a Fabry-Perot structure having two reflective surfaces spaced apart at a distance from each other, a spectral acquisition arrangement coupled to the optical sensor arrangement, and a spectral analysis arrangement coupled to the spectral acquisition arrangement, the computer readable program code means in said article of manufacture comprising:
computer readable program code means for acquiring, by the spectral acquisition arrangement, successive spectral responses from the optical sensor arrangement during successive time intervals; and
computer readable program code means for detecting, by the spectral analysis arrangement, a periodicity of ones of the successive spectral responses and a phase evolution of the periodicity throughout the ones of the successive spectral responses by
applying a transform of the time-to-frequency type to the ones of the successive spectral responses to obtain an amplitude representation and a phase representation for the ones of the successive spectral responses,
identifying a location where a peak occurs in a first amplitude representation,
extracting, from successive phase representations, local phase data at locations corresponding to the location where the peak occurs in the first amplitude representation, and
generating a series of the local phase data representing a local phase evolution in the successive phase representations,
thereby detecting the phase evolution of the periodicity throughout ones of the successive spectral responses.

* * * * *